(12) United States Patent
Zhuang et al.

(10) Patent No.: US 11,700,154 B2
(45) Date of Patent: Jul. 11, 2023

(54) DRIVER OF ETHERNET TRANSMITTER AND CONTROL METHOD THEREFOR

(71) Applicant: MAXIO Technology (Hangzhou) Co., Ltd., Hangzhou (CN)

(72) Inventors: Zhiyu Zhuang, Hangzhou (CN); Yufeng Hua, Hangzhou (CN); Sa He, Hangzhou (CN); Yiren Huang, Hangzhou (CN)

(73) Assignee: MAXIO TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/709,737

(22) Filed: Mar. 31, 2022

(65) Prior Publication Data

US 2022/0321385 A1    Oct. 6, 2022

(30) Foreign Application Priority Data

Mar. 31, 2021    (CN) .......................... 202110345085.7

(51) Int. Cl.
*H04L 25/02* (2006.01)
*H04L 12/10* (2006.01)

(52) U.S. Cl.
CPC ............ *H04L 25/028* (2013.01); *H04L 12/10* (2013.01); *H04L 25/0266* (2013.01); *H04L 25/0272* (2013.01)

(58) Field of Classification Search
CPC ............... H04L 25/0278; H04L 25/028; H04L 25/0266; H04L 25/0272
See application file for complete search history.

(56) References Cited

U.S. PATENT DOCUMENTS

| | | | | |
|---|---|---|---|---|
| 5,946,301 A | * | 8/1999 | Swanson ................. | H04L 43/50 370/252 |
| 7,839,994 B1 | * | 11/2010 | Roo ..................... | H04L 25/4919 379/399.01 |
| 8,598,906 B2 | * | 12/2013 | van der Goes ........ | H03K 3/012 327/108 |
| 2005/0116745 A1 | * | 6/2005 | Huang ................ | H04L 25/0278 327/108 |
| 2006/0214826 A1 | * | 9/2006 | Huang ..................... | H04B 3/00 341/51 |
| 2020/0091883 A1 | * | 3/2020 | Sharma ............... | H03F 3/45174 |

FOREIGN PATENT DOCUMENTS

CN    113079105 A    7/2021
CN    113098667 A    7/2021

* cited by examiner

*Primary Examiner* — Sophia Vlahos
(74) *Attorney, Agent, or Firm* — Westman, Champlin & Koehler, P.A.

(57) ABSTRACT

Disclosed is a driver of an ethernet transmitter and a control method therefor. The driver has a first output port and a second output port connected to an ethernet receiver through a transmission line, and comprises: a signal conversion module for converting differential current signals into a first voltage signal and a second voltage signal; a first driving module adjusting a swing of the first voltage signal, to obtain a first output signal having a voltage equal to the first voltage signal; a second driving module adjusting a swing of the second voltage signal, to obtain a second output signal having a voltage equal to the second voltage signal. An architecture having a relatively small area is realized, and the ethernet transmitter meets the requirement on a large output swing in 10BASE-T mode.

10 Claims, 6 Drawing Sheets

DRIVER OF ETHERNET TRANSMITTER AND CONTROL METHOD THEREFOR

CROSS-REFERENCES TO RELATED APPLICATION

This application claims priority to Chinese Application No. 202110345085.7, filed on Mar. 31, 2021, entitled "DRIVER OF ETHERNET TRANSMITTER AND CONTROL METHOD THEREFOR", published as CN113098415A on Jul. 9, 2021, the entire contents of which are incorporated herein by reference in their entirety.

FIELD OF THE DISCLOSURE

The present disclosure relates to a technical field of ethernet transceivers, in particular to a driver of an ethernet transmitter and a control method for a driver of an ethernet transmitter.

DESCRIPTION OF THE RELATED ART

According to requirements of standard performance evaluation corporation (SPEC), the output swing of a gigabit ethernet (GBE) transmitter should be 4.4 V to 5.6 V in 10BASE-T mode, and should be 1.9 V to 2.1 V in 100BASE-TX and 1000BASE-T modes. However, with a traditional driver, the transmitter does not have the output swing meeting the requirements in 10BASE-T mode.

In the related art, a voltage mode driver and a current mode driver collaborate to drive a load together, so as to increase an output swing of a transmitter. The principle of the voltage mode driver is to perform voltage division by use of resistors, and a differential swing of an output signal is certainly smaller than an input signal (VDD), such that the voltage mode driver and the current mode driver collaborate to increase the swing of an output signal to be within a range from the input signal VDD to twice of the input signal VDD. The ideal output impedance of the current mode driver is extremely large, such that in theory, the overall output impedance in the case that the voltage mode driver collaborates with the current mode driver is determined by the voltage mode driver, and the voltage mode driver alone can realize impedance matching relatively easily.

However, an architecture formed by using both of the voltage mode driver and the current mode driver has the following disadvantage that each of the voltage mode driver and the current mode driver is constructed by using an operational amplifier, and the area of the operational amplifier is dozen times that of a conventional resistor or transistor, etc., such that the overall area of the voltage mode driver and the current mode driver is large, thereby causing serious high-frequency return loss.

SUMMARY OF THE DISCLOSURE

In order to solve the above technical problem, the present disclosure provides a driver of an ethernet transmitter and a control method for a driver of an ethernet transmitter, which can be realized by means of an architecture having a relatively small area, the transmitter can meet the requirement on large output swing in 10BASE-T mode.

According to a first aspect of the present disclosure, there is provided a driver of an ethernet transmitter. The driver has a first output port and a second output port, wherein the first output port and the second output port are connected to an ethernet receiver through a transmission line. The driver comprises a signal conversion module, a first driving module and a second driving module.

The signal conversion module is connected to a previous-stage circuit, and configured to convert differential current signals provided by the previous-stage circuit into a first voltage signal and a second voltage signal and transmit the first voltage signal and the second voltage signal to the first driving module and the second driving module respectively.

The first driving module is connected between a first output terminal of the signal conversion module and the first output port, and is configured to adjust a swing of the first voltage signal, so as to obtain a first output signal at the first output port, wherein the first output signal has a voltage equal to the first voltage signal.

The second driving module is connected between a second output terminal of the signal conversion module and the second output port, and is configured to adjust a swing of the second voltage signal, so as to obtain a second output signal at the second output port, wherein the second output signal has a voltage equal to the second voltage signal.

Optionally, the first driving module comprises a first voltage driving unit, a second voltage driving unit and a first impedance matching unit.

The first voltage driving unit and the first impedance matching unit are connected in series between the first output terminal of the signal conversion module and the first output port, and are connected to the second voltage driving unit in parallel, such that a first equivalent impedance of the first driving module matches an equivalent impedance of the driver of the ethernet receiver.

The second driving module comprises a third voltage driving unit, a fourth voltage driving unit and a second impedance matching unit.

The third voltage driving unit and the second impedance matching unit are connected in series between the second output terminal of the signal conversion module and the second output port, and are connected to the fourth voltage driving unit in parallel, such that a second equivalent impedance of the second driving module matches the equivalent impedance of the driver of the ethernet receiver.

Optionally, the signal conversion module comprises an operational amplifier, a first conversion unit, and a second conversion unit.

A first input terminal and a second input terminal of the operational amplifier are connected to the previous-stage circuit, respectively and the operational amplifier is configured to convert the differential current signals into differential voltage signals.

The first conversion unit comprises a first P-channel metal-oxide semiconductor (PMOS) transistor and a first N-channel metal oxide semiconductor (NMOS) transistor. A drain electrode of the first PMOS transistor and a drain electrode of the first NMOS transistor are both connected to an input terminal of the first driving module. A gate electrode of the first PMOS transistor and a gate electrode of the first NMOS transistor are both connected to a first output terminal of the operational amplifier. A source electrode of the first PMOS transistor is connected to a power supply terminal, and a source electrode of the first NMOS transistor is grounded. The drain electrode of the first PMOS transistor is configured to output the first voltage signal. The first conversion unit further comprises a first resistor connected in series between the first input terminal of the operational amplifier and the drain electrode of the first PMOS transistor.

The second conversion unit comprises a second PMOS transistor and a second NMOS transistor. A drain electrode of the second PMOS transistor and a drain electrode of the second NMOS transistor are both connected to an input terminal of the second driving module. A gate electrode of the second PMOS transistor and a gate electrode of the second NMOS transistor are both connected to a second output terminal of the operational amplifier. A source electrode of the second PMOS transistor is connected to the power supply terminal, and a source electrode of the second NMOS transistor is grounded. The drain electrode of the second PMOS transistor outputs the second voltage signal. The second conversion unit further comprises a second resistor connected in series between the second input terminal of the operational amplifier and the drain electrode of the second PMOS transistor.

Optionally, the first voltage driving unit comprises a third PMOS transistor and a third NMOS transistor. A drain electrode of the third PMOS transistor and a drain electrode of the third NMOS transistor are connected to a first node. A gate electrode of the third PMOS transistor and a gate electrode of the third NMOS transistor are both connected to the first output terminal of the operational amplifier. A source electrode of the third PMOS transistor is connected to the power supply terminal, and a source electrode of the third NMOS transistor is grounded. The first voltage driving unit further comprises a third resistor connected in series between the first output terminal of the signal conversion module and the first node.

The second voltage driving unit comprises a fourth PMOS transistor and a fourth NMOS transistor. A drain electrode of the fourth PMOS transistor and a drain electrode of the fourth NMOS transistor are both connected to the first output port. A gate electrode of the fourth PMOS transistor and a gate electrode of the fourth NMOS transistor are both connected to the first output terminal of the operational amplifier. A source electrode of the fourth PMOS transistor is connected to the power supply terminal, and a source electrode of the fourth NMOS transistor is grounded. The second voltage driving unit further comprises a fourth resistor connected in series between the first output terminal of the signal conversion module and the first output port.

The first impedance matching unit comprises a fifth resistor connected in series between the first node and the first output port.

Optionally, the third voltage driving unit comprises a fifth PMOS transistor and a fifth NMOS transistor. A drain electrode of the fifth PMOS transistor and a drain electrode of the fifth NMOS transistor are connected to a second node. A gate electrode of the fifth PMOS transistor and a gate electrode of the fifth NMOS transistor are both connected to the second output terminal of the operational amplifier. A source electrode of the fifth PMOS transistor is connected to the power supply terminal, and a source electrode of the fifth NMOS transistor is grounded. The third voltage driving unit further comprises a sixth resistor connected in series between the second output terminal of the signal conversion module and the second node.

The fourth voltage driving unit comprises a sixth PMOS transistor and a sixth NMOS transistor. A drain electrode of the sixth PMOS transistor and a drain electrode of the sixth NMOS transistor are both connected to the second output port. A gate electrode of the sixth PMOS transistor and a gate electrode of the sixth NMOS transistor are both connected to the second output terminal of the operational amplifier. A source electrode of the sixth PMOS transistor is connected to the power supply terminal, and a source electrode of the sixth NMOS transistor is grounded. The fourth voltage driving unit further comprises a seventh resistor connected in series between the second output terminal of the signal conversion module and the second output port.

The second impedance matching unit comprises an eighth resistor connected in series between the second node and the second output port.

Optionally, a ratio of a width-to-length ratio of the third PMOS transistor to a width-to-length ratio of the first PMOS transistor is M, and a ratio of a width-to-length ratio of the third NMOS transistor to a width-to-length ratio of the first NMOS transistor is M, where M>40.

A ratio of a width-to-length ratio of the fourth PMOS transistor to a width-to-length ratio of the first PMOS transistor is N, and a ratio of a width-to-length ratio of the fourth NMOS transistor to a width-to-length ratio of the first NMOS transistor is N, where N>40.

A ratio of a width-to-length ratio of the fifth PMOS transistor to a width-to-length ratio of the second PMOS transistor is M, and a ratio of a width-to-length ratio of the fifth NMOS transistor to a width-to-length ratio of the second NMOS transistor is M.

A ratio of a width-to-length ratio of the sixth PMOS transistor to a width-to-length ratio of the second PMOS transistor is N, and a ratio of a width-to-length ratio of the sixth NMOS transistor to a width-to-length ratio of the second NMOS transistor is N.

Optionally, a resistance ratio of the third resistor to the fifth resistor is Y, and a resistance ratio of the fourth resistor to the fifth resistor is Z, where Y>100 and Z>100.

A resistance ratio of the sixth resistor to the eighth resistor is Y, and a resistance ratio of the seventh resistor to the eighth resistor is Z.

Optionally, the first impedance matching unit and the second impedance matching unit each have a resistance equal to the equivalent impedance of the driver of the ethernet receiver and equal to a characteristic impedance of the transmission line.

Optionally, the driver further comprises a mode switching module, wherein the mode switching module comprises a first switching unit, a second switching unit and a controller.

The first switching unit comprises a first switch connected in series between the first output terminal of the signal conversion module and the first node, a second switch arranged on a connecting line between the first output terminal of the signal conversion module and the third resistor, a third switch arranged on a connecting line between the first output terminal of the signal conversion module and the fourth resistor, a fourth switch arranged on a connecting line between the gate electrode of the fourth PMOS transistor and the operational amplifier, and a fifth switch arranged on a connecting line between the gate electrode of the fourth NMOS transistor and the operational amplifier.

The second switching unit comprises a sixth switch connected in series between the second output terminal of the signal conversion module and the second node, a seventh switch arranged on a connecting line between the second output terminal of the signal conversion module and the sixth resistor, an eighth switch arranged on a connecting line between the second output terminal of the signal conversion module and the seventh resistor, a ninth switch arranged on a connecting line between the gate electrode of the sixth PMOS transistor and the operational amplifier, and a tenth switch arranged on a connecting line between the gate electrode of the sixth NMOS transistor and the operational amplifier.

The controller is configured to control on and off states of the first switch, the second switch, the third switch, the fourth switch, the fifth switch, the sixth switch, the seventh switch, the eighth switch, the ninth switch and the tenth switch such that the second switch, the third switch, the fourth switch, the fifth switch, the seventh switch, the eighth switch, the ninth switch and the tenth switch have the same on or off state, which is opposite to the on or off state of the first switch, and the first switch and the sixth switch have the same on or off state.

A second aspect of the present disclosure provides a control method for a driver, which is configured to control the last optional driver of the first aspect. The control method comprises:

receiving a mode selection instruction;

determining whether the mode selection instruction is an instruction for selecting ethernet in 10BASE-T mode or an instruction for selecting ethernet in 100BASE-TX/1000BASE-T mode;

controlling, in a case that the mode selection instruction is the instruction for selecting ethernet in the 10BASE-T mode, a first switch and a sixth switch to be off, and a second switch, a third switch, a fourth switch, a fifth switch, a seventh switch, an eighth switch, a ninth switch and a tenth switch to be on; and controlling, in a case that the mode selection instruction is the instruction for selecting ethernet in the 100BASE-TX/1000BASE-T mode, the first switch and the sixth switch to be on, and the second switch, the third switch, the fourth switch, the fifth switch, the seventh switch, the eighth switch, the ninth switch and the tenth switch to be off.

The present disclosure has the beneficial effects:

In the driver of the ethernet transmitter according to the present disclosure, the signal conversion module is configured to convert the differential current signals provided by the previous-stage circuit into the differential first voltage signal and second voltage signal, the first driving module is configured to adjust the swing of the first voltage signal, so as to obtain the first output signal at the first output port, and the second driving module is configured to adjust the swing of the second voltage signal, so as to obtain the second output signal at the second output port. The first output signal has a voltage equal to the first voltage signal, and the second output signal has a voltage equal to the second voltage signal, such that the first output port and the second output port serving as two output ports of the driver may enable the ethernet transmitter to meet the requirement on large output swing in the 10BASE-T mode. Moreover, the first driving module and the second driving module can respectively combined with the signal conversion module to form voltage mode drivers, and the two voltage mode drivers may be constructed by sharing a common amplifier, such that according to the driver, an architecture having a relatively small area can be realized, and the ethernet transmitter may meet the requirement on large output swing in the 10BASE-T mode.

BRIEF DESCRIPTION OF THE DRAWINGS

With reference to the description of the accompanying drawings below on the embodiments of the present disclosure, the above and other objectives, features and advantages of the present disclosure will become more apparent, and wherein.

DETAILED DESCRIPTION OF EMBODIMENTS OF THE DISCLOSURE

In order to facilitate understanding of the present disclosure, the present disclosure will be described more comprehensively with reference to the relevant accompanying drawings. A preferred embodiment of the present disclosure is given in the accompanying drawings. However, the present disclosure may be implemented in many different forms and is not limited to the embodiments described herein. On the contrary, these embodiments are provided for making content disclosed in the present disclosure to be understood more thoroughly and comprehensively.

Unless otherwise defined, all technical and scientific terms used herein have the same meaning as commonly understood by those skilled in the technical field of the present disclosure. The terms used in the description of the present disclosure are merely for the purpose of describing specific embodiments, and are not intended to limit the present disclosure.

Figure 1:
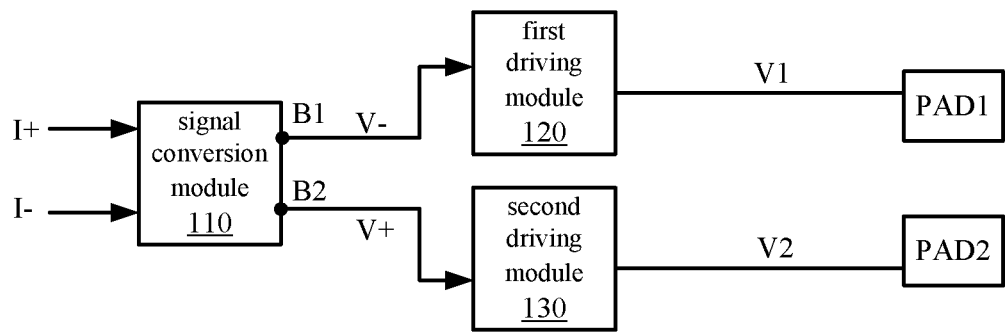
FIG. 1 shows a structural diagram of a driver according to an embodiment of the present disclosure.

FIG. 1 shows a structural diagram of a driver of an ethernet transmitter according to an embodiment of the present disclosure. With reference to FIG. 1, the driver has a first output port PAD1 and a second output port PAD2, wherein the first output port PAD1 and the second output port PAD2 are connected to an ethernet receiver through a transmission line. The driver further comprises a signal conversion module 110, a first driving module 120 and a second driving module 130. The signal conversion module 110 is connected to a previous-stage circuit, and is configured to convert differential current signals I− and I+ provided by the previous-stage circuit into a first voltage signal V− and a second voltage signal V+ and transmit the first voltage signal and the second voltage signal to the first driving module 120 and the second driving module 130, respectively. The first driving module 120 is connected between a first output terminal B1 of the signal conversion module 110 and the first output port PAD1, and is configured to adjust a swing of the first voltage signal V−, so as obtain a first output signal V1 at the first output port PAD1. The first output signal V1 has a voltage value equal to a voltage value of the first voltage signal V−. The second driving module 130 is connected between a second output terminal B2 of the signal conversion module 110 and the second output port PAD2, and is configured to adjust a swing of the second voltage signal V+, so as to obtain a second output signal V2 at the second output port PAD2. The second output signal V2 has a voltage value equal to a voltage value of the second voltage signal V+. A voltage difference between the second output signal V2 and the first output signal V1 is a differential voltage received by the ethernet receiver. A differential output swing of the driver may range from 4.4 V to 5.6 V in 10BASE-T mode.

Figure 2:
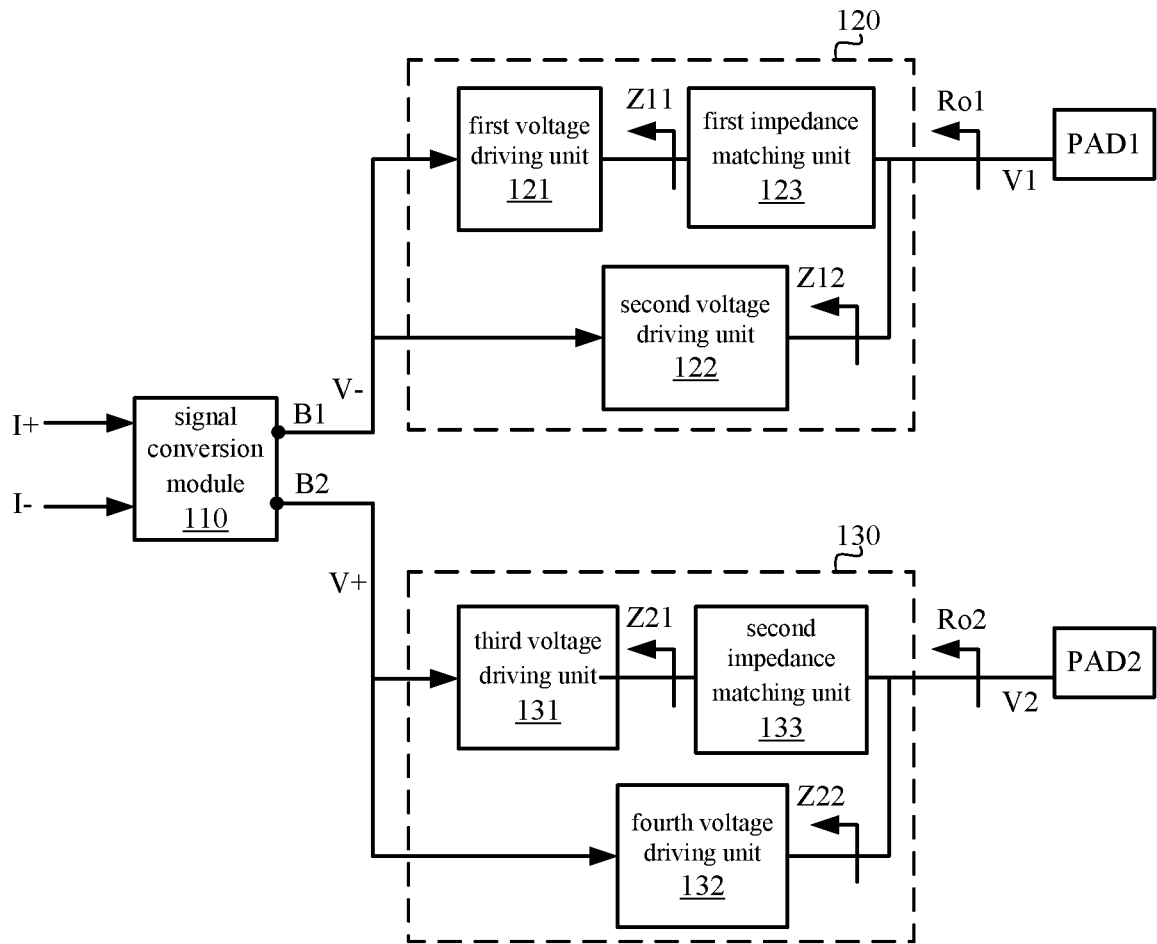
FIG. 2 shows another structural diagram of a driver according to an embodiment of the present disclosure.

FIG. 2 shows another structural diagram of a driver of an ethernet transmitter according to an embodiment of the present disclosure. With reference to FIG. 2, the first driving module 120 comprises a first voltage driving unit 121, a second voltage driving unit 122 and a first impedance matching unit 123. The first voltage driving unit 121 and the first impedance matching unit 123 are connected in series between the first output terminal B1 of the signal conversion module 110 and the first output port PAD1, and are connected to the second voltage driving unit 122 in parallel, such that as viewed from the first output port PAD1, the first equivalent impedance Ro1 of the first driving module 120 matches the equivalent impedance of a driver of the ethernet receiver. The second driving module 130 comprises a third voltage driving unit 131, a fourth voltage driving unit 132 and a second impedance matching unit 133. The third voltage driving unit 131 and the second impedance matching unit 133 are connected in series between the second output terminal B2 of the signal conversion module 110 and the second output port PAD2, and are connected to the fourth voltage driving unit 132 in parallel, such that as viewed from the second output port PAD2, the second equivalent impedance Ro2 of the second driving module 130 matches the equivalent impedance of the driver of the ethernet receiver. A differential output swing of the driver may range from 4.4 V to 5.6 V in 10BASE-T mode.

Figure 3:
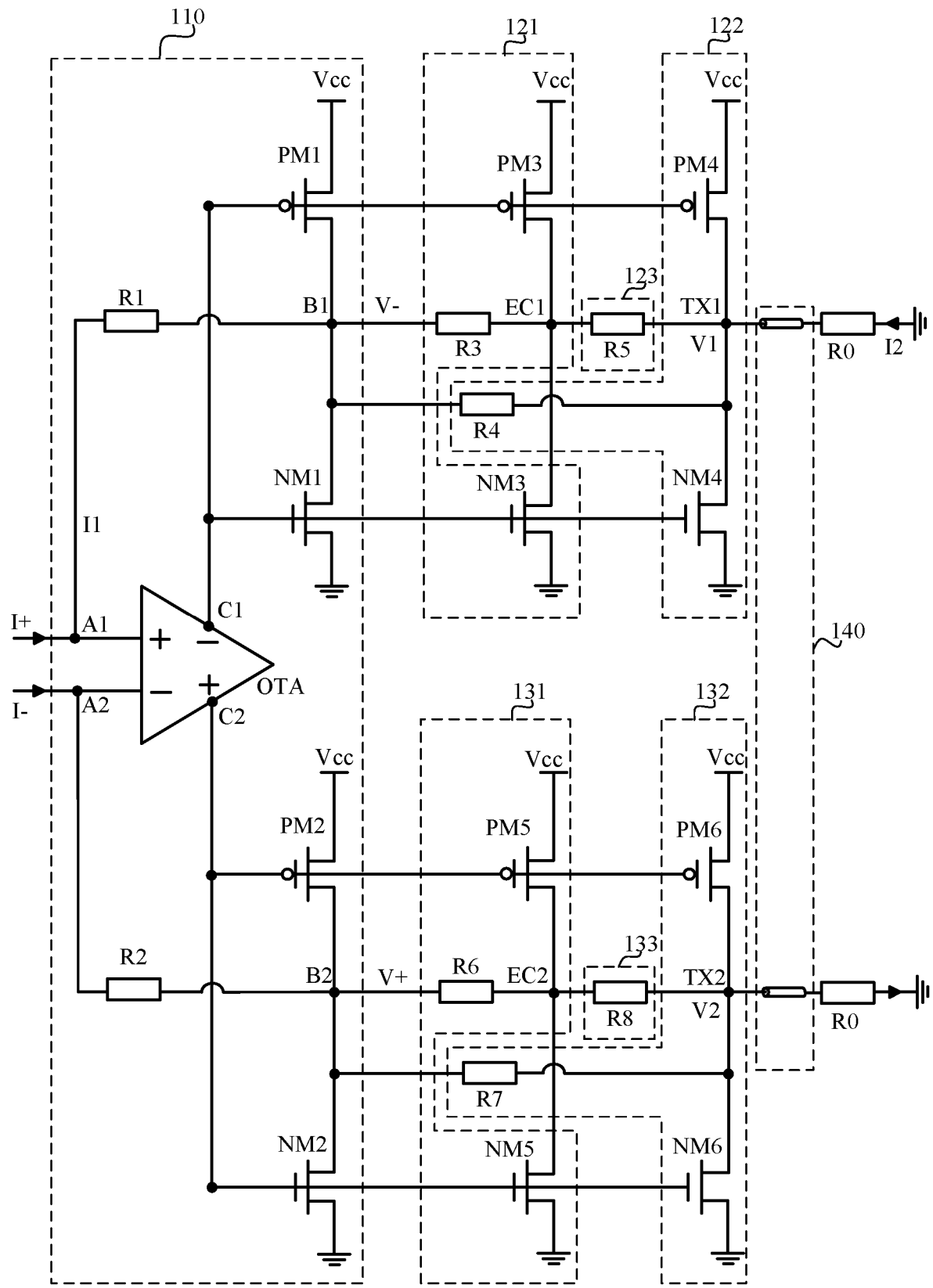
FIG. 3 shows a circuit diagram of a driver according to an embodiment of the present disclosure.

FIG. 3 shows a circuit diagram of a driver. Circuit structures of each module of the driver are described in detail below with reference to FIG. 3.

(I) Circuit Structure of Signal Conversion Module 110

The signal conversion module 110 comprises an operational amplifier OTA, a first conversion unit and a second conversion unit.

A first input terminal A1 and a second input terminal A2 of the operational amplifier OTA are connected to the previous-stage circuit, respectively, and the operational amplifier OTA is configured to convert the differential current signals I− and I+ into the differential voltage signals.

The first conversion unit comprises a first P-channel metal-oxide semiconductor (PMOS) transistor PM1, a first N-channel metal oxide semiconductor (NMOS) transistor NM1 and a first resistor R1. A drain electrode of the first PMOS transistor PM1 and a drain electrode of the first NMOS transistor NM1 are connected to serve as the first output terminal B1 of the signal conversion module 110 to be connected to an input terminal of the first driving module 120. A gate electrode of the first PMOS transistor PM1 and a gate electrode of the first NMOS transistor NM1 are both connected to a first output terminal C1 of the operational amplifier OTA. A source electrode of the first PMOS transistor PM1 is connected to a power supply terminal Vcc, and a source electrode of the first NMOS transistor NM1 is grounded. The drain electrode of the first PMOS transistor PM1 (that is, the first output terminal B1 of the signal conversion module 110) outputs the first voltage signal V−. The first resistor R1 is connected in series between the first input terminal A1 of the operational amplifier OTA and the drain electrode of the first PMOS transistor PM1.

The second conversion unit comprises a second PMOS transistor PM2, a second NMOS transistor NM2 and a second resistor R2. A drain electrode of the second PMOS transistor PM2 and a drain electrode of the second NMOS transistor NM are connected to serve as a second output terminal B2 of the signal conversion module 110 to be connected to an input terminal of the second driving module 130. A gate electrode of the second PMOS transistor PM2 and a gate electrode of the second NMOS transistor NM are both connected to a second output terminal C2 of the operational amplifier OTA. A source electrode of the second PMOS transistor PM2 is connected to the power supply terminal Vcc, and a source electrode of the second NMOS transistor NM2 is grounded. The drain electrode of the second PMOS transistor PM2 (that is, the second output terminal B2 of the signal conversion module 110) outputs the second voltage signal V+. The second resistor R2 is connected in series between the second input terminal A2 of the operational amplifier OTA and the drain electrode of the second PMOS transistor PM2.

Further, the first input terminal A1 of the operational amplifier OTA is a non-inverting input terminal of the operational amplifier OTA, and the second input terminal A2 of the operational amplifier OTA is an inverting input terminal of the operational amplifier OTA. The first output terminal C1 of the operational amplifier OTA is an inverting output terminal of the operational amplifier OTA, and the second output terminal C2 of the operational amplifier OTA is a non-inverting output terminal of the operational amplifier OTA.

In the signal conversion module 110, the operational amplifier OTA is combined with the first PMOS transistor PM1, the first NMOS transistor NM1 and the first resistor R1, and combined with the second PMOS transistor PM2, the second NMOS transistor NM2 and the second resistor R2, to form a differential transimpedance amplifier, such that the differential current signals I− and I+ are converted into the differential voltage signals (that is, the first voltage signal V− and the second voltage signal V+) on the basis of the differential transimpedance amplifier.

(II) Circuit Configuration of First Driving Module 120

The first voltage driving unit 121 comprises a third resistor R3, a third PMOS transistor PM3 and a third NMOS transistor NM3. A drain electrode of the third PMOS transistor PM3 and a drain electrode of the third NMOS transistor NM3 are connected to a first node EC1. A gate electrode of the third PMOS transistor PM3 and a gate electrode of the third NMOS transistor NM3 are both connected to the first output terminal C1 of the operational amplifier OTA. A source electrode of the third PMOS transistor PM3 is connected to the power supply terminal Vcc, and a source electrode of the third NMOS transistor NM3 is grounded. The third resistor R3 is connected in series between the first output terminal B1 of the signal conversion module 110 and the first node EC1.

The second voltage driving unit 122 comprises a fourth resistor R4, a fourth PMOS transistor PM4 and a fourth NMOS transistor NM4. A node TX1, which is formed by connecting a drain electrode of the fourth PMOS transistor PM4 and a drain electrode of the fourth NMOS transistor NM4, is connected to the first output port PAD1. A gate electrode of the fourth PMOS transistor PM4 and a gate electrode of the fourth NMOS transistor NM4 are both connected to the first output terminal C1 of the operational amplifier OTA. A source electrode of the fourth PMOS transistor PM4 is connected to the power supply terminal Vcc, and a source electrode of the fourth NMOS transistor NM4 is grounded. The fourth resistor R4 is connected in series between the first output terminal B1 of the signal conversion module 110 and the first output port PAD1.

The first impedance matching unit 123 comprises a fifth resistor R5 connected in series between the first node EC1 and the first output port PAD1.

In the first driving module 120, the third PMOS transistor PM3, the first PMOS transistor PM1, the third NMOS transistor NM3 and the first NMOS transistor NM1 have equal gate-source voltages. Therefore, in the case that the ratio of the width-to-length ratio of the third PMOS transistor PM3 to the width-to-length ratio of the first PMOS transistor PM1 is M, and the ratio of the width-to-length ratio of the third NMOS transistor NM3 to the width-to-length ratio of the first NMOS transistor NM1 is M, a current flowing out of a branch of the first PMOS transistor PM1 and a branch of the first NMOS transistor NM1 is I, and a current flowing out of a branch of the third PMOS transistor PM3 and a current flowing out of a branch of the third NMOS transistor NM3 is M·I (in the following description, I and M are as defined here unless otherwise specified).

Similarly, since the fourth PMOS transistor PM4, the first PMOS transistor PM1, the fourth NMOS transistor NM4 and the first NMOS transistor NM1 are have equal gate-source voltages, in the case that the ratio of the width-to-length ratio of the fourth PMOS transistor PM4 to the width-to-length ratio of the first PMOS transistor PM1 is N, and the ratio of the width-to-length ratio of the fourth NMOS transistor NM4 to the width-to-length ratio of the first NMOS transistor NM1 is N, a current flowing out of a branch of the fourth PMOS transistor PM4 and a current flowing out of a branch of the fourth NMOS transistor NM4 is N·I (in the following description, N is as defined here unless otherwise specified).

It should be noted that by adjusting the resistance ratio of the third resistor R3 to the fifth resistor R5 at first, a voltage of the first output signal V1 may be adjusted. By adjusting the resistance ratio of the fourth resistor R4 to the fifth resistor R5 after the resistance ratio of the third resistor R3 to the fifth resistor R5 is adjusted, the first equivalent impedance Ro1 may be adjusted. In the case that the fifth resistor R5 has a fixed resistance, by adjusting a resistance of the third resistor R3, the voltage of the first output signal V1 may be adjusted, and then, by adjusting a resistance of the fourth resistor R4, the first equivalent impedance Ro1 may be adjusted.

(III) Circuit Structure of Second Driving Module 130

The third voltage driving unit 131 comprises a sixth resistor R6, a fifth PMOS transistor PM5 and a fifth NMOS transistor NM5. A drain electrode of the fifth PMOS transistor PM5 and a drain electrode of the fifth NMOS transistor NM5 are connected to a second node EC2. A gate electrode of the fifth PMOS transistor PM5 and a gate electrode of the fifth NMOS transistor NM5 are both connected to the second output terminal C2 of the operational amplifier OTA. A source electrode of the fifth PMOS transistor PM5 is connected to the power supply terminal Vcc, and a source electrode of the fifth NMOS transistor NM5 is grounded. The sixth resistor R6 is connected in series between the second output terminal B2 of the signal conversion module 110 and the second node EC2.

The fourth voltage driving unit 132 comprises a seventh resistor R7, a sixth PMOS transistor PM6 and a sixth NMOS transistor NM6. A node TX2, which is formed by connecting a drain electrode of the sixth PMOS transistor PM6 and a drain electrode of the sixth NMOS transistor NM6 are connected, is connected to the second output port PAD2. A gate electrode of the sixth PMOS transistor PM6 and a gate electrode of the sixth NMOS transistor NM6 are both connected to the second output terminal C2 of the operational amplifier OTA. A source electrode of the sixth PMOS transistor PM6 is connected to the power supply terminal Vcc, and a source electrode of the sixth NMOS transistor NM6 is grounded. The seventh resistor R7 is connected in series between the second output terminal B2 of the signal conversion module 110 and the second output port PAD2.

The second impedance matching unit 133 comprises an eighth resistor R8 connected in series between the second node EC2 and the second output port PAD2.

In the second driving module 130, the ratio of the width-to-length ratio of the fifth PMOS transistor PM5 to the width-to-length ratio of the second PMOS transistor PM2 is M, the ratio of the width-to-length ratio of the fifth NMOS transistor NM5 to the width-to-length ratio of the second NMOS transistor NM2 is M, the ratio of the width-to-length ratio of the sixth PMOS transistor PM6 to the width-to-length ratio of the second PMOS transistor PM2 is N, and the ratio of the width-to-length ratio of the sixth NMOS transistor NM6 to the width-to-length ratio of the second NMOS transistor NM2 is N.

Since the third voltage driving unit 131 has a structure similar to that of the first voltage driving unit 121, the fourth voltage driving unit 132 has a structure similar to that of the second voltage driving unit 122, and the second impedance matching unit 133 has a structure similar to that of the first impedance matching unit 123, a specific working principle of the second driving module 130 may be described with reference to the related description of the first driving module 120, and will not be repeated here. A working principle of the first driving module 120 will be described below.

The first impedance matching unit 123 has a resistance equal to the equivalent impedance R0 of the driver of the ethernet receiver and equal to characteristic impedance of the transmission line 140. In general, the transmission line 140 has a characteristic impedance of 50 ohm.

A ratio K of the first voltage signal V− to the first output signal V1 is expressed by the following formula (1).

$$K = \frac{V-}{V1} = \frac{I1 \cdot R1}{I2 \cdot R0} = \frac{I1}{I2} \cdot \frac{R1}{R0} = \frac{I + MI \cdot \frac{1}{1+Y}}{NI + MI \cdot \frac{Y}{1+Y}} \cdot \frac{R1}{R0} \quad (1)$$

In the above formula (1), I1 is a current flowing through the first resistor R1, I2 is a current flowing through the equivalent impedance R0 (which is also referred to as external equivalent impedance below) of the driver of the ethernet receiver, Y is a resistance ratio of the third resistor R3 to the fifth resistor R5 (that is, R3=Y·R5), the ratio of the width-to-length ratio of the third PMOS transistor PM3 to the width-to-length ratio of the first PMOS transistor PM1 is M, which is same with the ratio of the width-to-length ratio of the third NMOS transistor NM3 to the width-to-length ratio of the first NMOS transistor NM1, and the ratio of the width-to-length ratio of the fourth PMOS transistor PM4 to the width-to-length ratio of the first PMOS transistor PM1 is N, which is same with the ratio of the width-to-length ratio of the fourth NMOS transistor NM4 to the width-to-length ratio of the first NMOS transistor NM1. I, serving as a current flowing out of a branch of the first PMOS transistor PM1 and a current flowing out of a branch of the first NMOS transistor NM1, is determined by the differential current signals input by the previous-stage circuit.

It can be seen from formula (1) that in the case that a resistance ratio of the first resistor R1 to the external equivalent impedance R0, M and N are constant, K is determined by Y. The first voltage signal V− is determined by the differential current signals, and further the differential current signals affect the first output signal V1 when K is determined. Therefore, for the constant first voltage signal V−, Y may be used for adjusting a voltage of the first output signal V1, and is specifically set according to M, N and X on the basis of the requirement of the voltage of the first output signal V1, where X is a resistance ratio of the first resistor R1 to the external equivalent impedance R0 (that is, R1=X·R0).

Specifically, the first output signal V1 is equal to the first voltage signal V− (that is, V1=V−), and a resistance ratio Y of the third resistor R3 to the fifth resistor R5 is determined by formula (2).

$$Y = \frac{N - X - MX}{X - N - M} \quad (2)$$

In a driver circuit, the equivalent resistance Re1 of the third resistor R3 and the fifth resistor R5 as viewed from the node TX1 is expressed by the following formula (3), and the equivalent resistance Re2 of the fourth resistor R4 as viewed from the node TX1 is expressed by the following formula (4).

$$Re1 = \frac{R3 + R5}{1 + X} \quad (3)$$

$$Re2 = \frac{R4}{1 + X}$$

Figure 4:
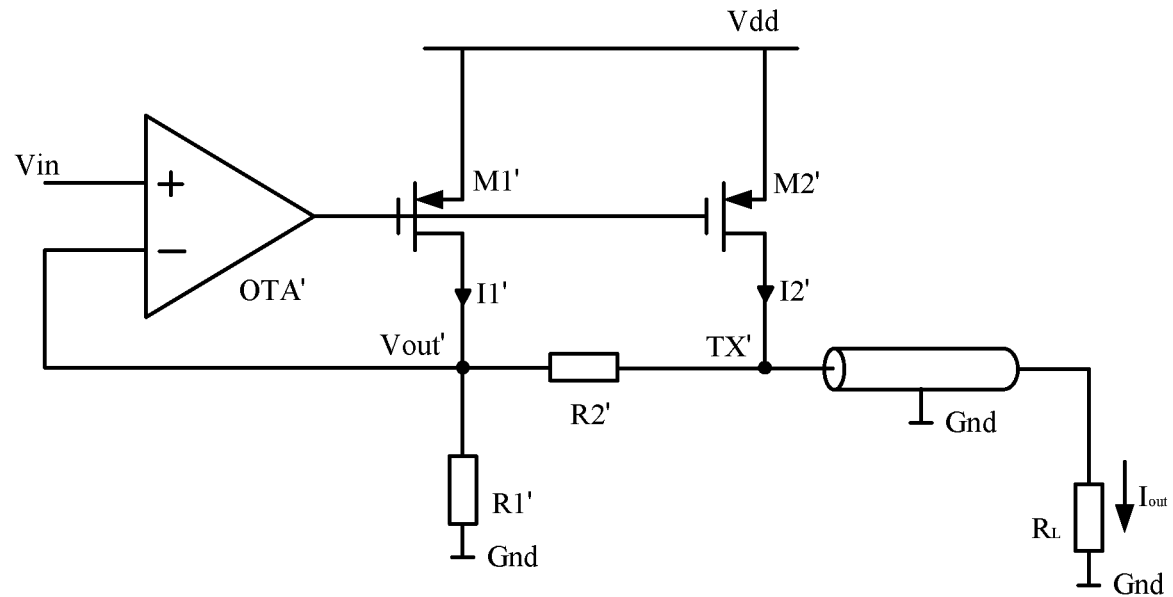
FIG. 4 shows a circuit diagram of a principle employed by a driver according to an embodiment of the present disclosure.
Figure 5:
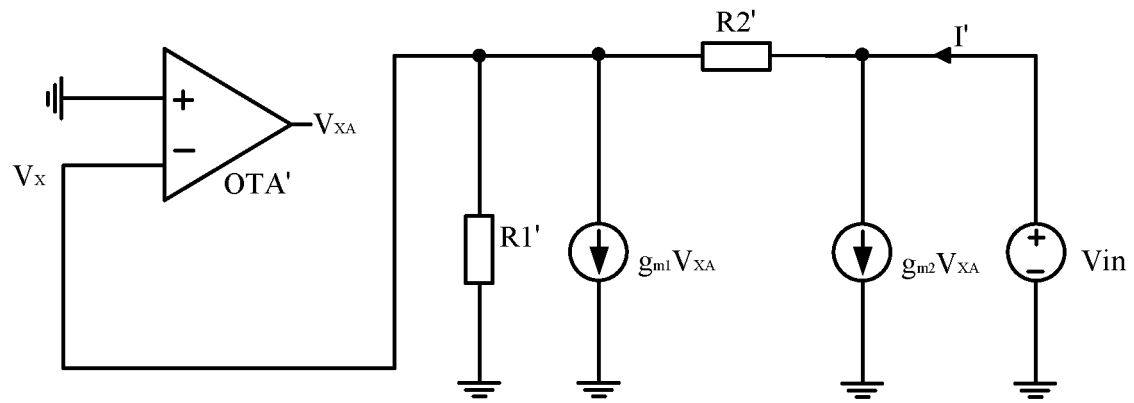
FIG. 5 shows a small signal model for solving an equivalent resistance at an output terminal of a circuit shown in FIG. 4.

For the driver circuit shown in FIG. 3, the formula (3) for expressing the equivalent resistance Re1 and the formula (4) for expressing the equivalent resistance Re2 are derived according to FIGS. 4 and 5.

With reference to FIG. 4, a source electrode of a transistor M1' and a source electrode of a transistor M2' are both connected to the power supply terminal Vdd. A gate electrode of the transistor M1' and a gate electrode of the transistor M2' are both connected to the output terminal of the operational amplifier OTA'. A drain electrode TX' of the transistor M2' is connected to a drain electrode Vout' of the transistor M1' through a resistor R2', a drain electrode Vout' of the transistor M1' is grounded through a resistor R1', and the drain electrode TX' of the transistor M2' is further grounded through a resistor $R_L$ (the resistor $R_L$ serves as a load resistor here). A ratio of a width-to-length ratio of the transistor M2' to a width-to-length ratio of the transistor M1' is n, and a resistance ratio of the resistor R1' to the resistor $R_L$ is n. Similar to the above analysis, the ratio of the width-to-length ratio of the transistor M2' to the width-to-length ratio of the transistor M1' is n, such that a current I2' in a branch of the transistor M2' is n times a current I1' in a branch of the transistor M1', and in the case that the resistance ratio of the resistor R1' to the resistor $R_L$ is n, an output terminal Vout' of the transistor M1' and the output terminal TX' of the transistor M2' have the same voltage. It should be noted here that since the output terminal Vout' of the transistor M1' and the output terminal TX' of the transistor M2' have the same voltage, there is no voltage drop on the resistor R2', that is, there is neither voltage loss nor current loss in the circuit.

FIG. 5 shows a small signal model for solving the equivalent resistance at an output terminal of a circuit shown in FIG. 4. With reference to FIG. 5, the transistors M1' and M2' have large internal resistance, which is omitted in the figure. Since the ratio of the width-to-length ratio of the transistor M2' to the width-to-length ratio of the transistor M1' is n, a small-signal current $g_{m2}$ of the transistor M2' and a small-signal current $g_{m1}$ of the transistor M1' have a relation shown in formula (5):

$$g_{m2} = n \cdot g_{m1} \quad (5)$$

It should be noted that in the circuit shown in FIG. 4, the operational amplifier OTA' limits the drain electrode Vout' of the transistor M1' to the inverting input terminal Vin of the operational amplifier OTA', such that the drain electrode TX' of the transistor M2' has a voltage Vin. Finally, the voltage Vin of the drain electrode TX' of the transistor M2' is expressed by formula (6), and a trunk current I' of the drain electrode TX' of the transistor M2' is expressed by formula (7).

$$Vin = \left(\frac{Vx}{R1'} + g_{m1} \cdot V_{XA}\right) \cdot R2' \quad (6)$$

$$I' = \frac{Vx}{R1'} + g_{m1} \cdot V_{XA} + g_{m2} \cdot V_{XA} \quad (7)$$

In formulas (6) and (7), $V_{XA}$ is a voltage of the output terminal of the operational amplifier OTA', and $V_X$ is a voltage of an inverting input terminal of the operational amplifier OTA'. Since the operational amplifier OTA' has large gain, $V_X \approx 0$, the equivalent output resistance $R_{eq}$ is expressed by formula (8), and in the circuit, output impedance changes in the case of no signal loss.

$$R_{eq} = \frac{Vin}{I'} = \frac{R2'}{n + 1} \quad (8)$$

On the basis of the above formula (8) derived in combination with FIGS. 4 and 5, in the case that in the circuit shown in FIG. 3, R1=X·R0, the equivalent resistance Re1 after the third resistor R3 and the fifth resistor R5 are connected in series is expressed by formula (3), and the equivalent resistance Re2 of the fourth resistor R4 is expressed by formula (4).

Then, in the circuit shown in FIG. 3, since the first equivalent impedance Ro1 is parallel resistance of the equivalent resistance Re1 and the equivalent resistance Re2 as viewed from the node TX1, the first equivalent impedance Ro1 is expressed by the following formula (9).

$$Ro1 = \frac{Re1 \cdot Re2}{Re1 + Re2} \quad (9)$$

In the case of R5=Y·R3, it is deduced by combining the formula (9), the formula (1), the formula (3) and the formula (4) that in order to make Ro1=R0 satisfied, resistance of the fourth resistor R4 is adjusted to enable a resistance ratio Z of the fourth resistor R4 to the fifth resistor R5 to be expressed by formula (10).

$$Z = \frac{(1 + X)(1 + Y)}{(1 + Y) \cdot R4 - (1 + X) \cdot R0} \cdot R0 \quad (10)$$

After a resistance ratio of the external equivalent impedance R0 to the fifth resistor R5 is determined, it can be seen in combination of the formula (10) that the resistance ratio Z of the fourth resistor R4 to the fifth resistor R5 may be used for adjusting the first equivalent impedance Ro1, and specifically, is determined according to X and Y, so as to make the first equivalent impedance Ro1 equal to the external equivalent impedance R0.

In a real circuit, due to resistance and parasitic capacitance of a transistor, it is set that M and N are both greater than 40, Y>100 and Z>100, such that adverse effects of the resistance and parasitic capacitance of each MOS transistor in the circuit on accuracy of the driver circuit may be ignored.

For the driver circuit shown in FIG. 3, a set of typical values is given below: R5=50 ohm, Y=138, Z=142, M=N=47, X=70 and R4=7100 ohm, then Re1=R5·139/71=100 ohm and Re2=100 ohm, and the first equivalent impedance Ro1=50 ohm, that is, Ro1=R0. It should be noted that the set of values here does not represent a limitation of the present disclosure, but only gives exemplary data making Ro1=R0 and V1=V− satisfied.

In the circuit shown in FIG. 3, the first driving module 120 and the signal conversion module 110 are combined to form a first voltage mode driver, and the second driving module 130 and the signal conversion module 110 are combined to form a second voltage mode driver, such that the two voltage mode drivers may be constructed by using one amplifier. Therefore, according to the driver, the signal conversion module 110, the first driving module 120 and the second driving module 130 are combined, such that an architecture having a relatively small area and large output swing can be realized, and requirement on large output swing of the ethernet transmitter in 10BASE-T mode is met. Moreover, by use of specific construction circuits of the first driving module 120 and the second driving module 130, the driver may better realize impedance matching.

Figure 6:
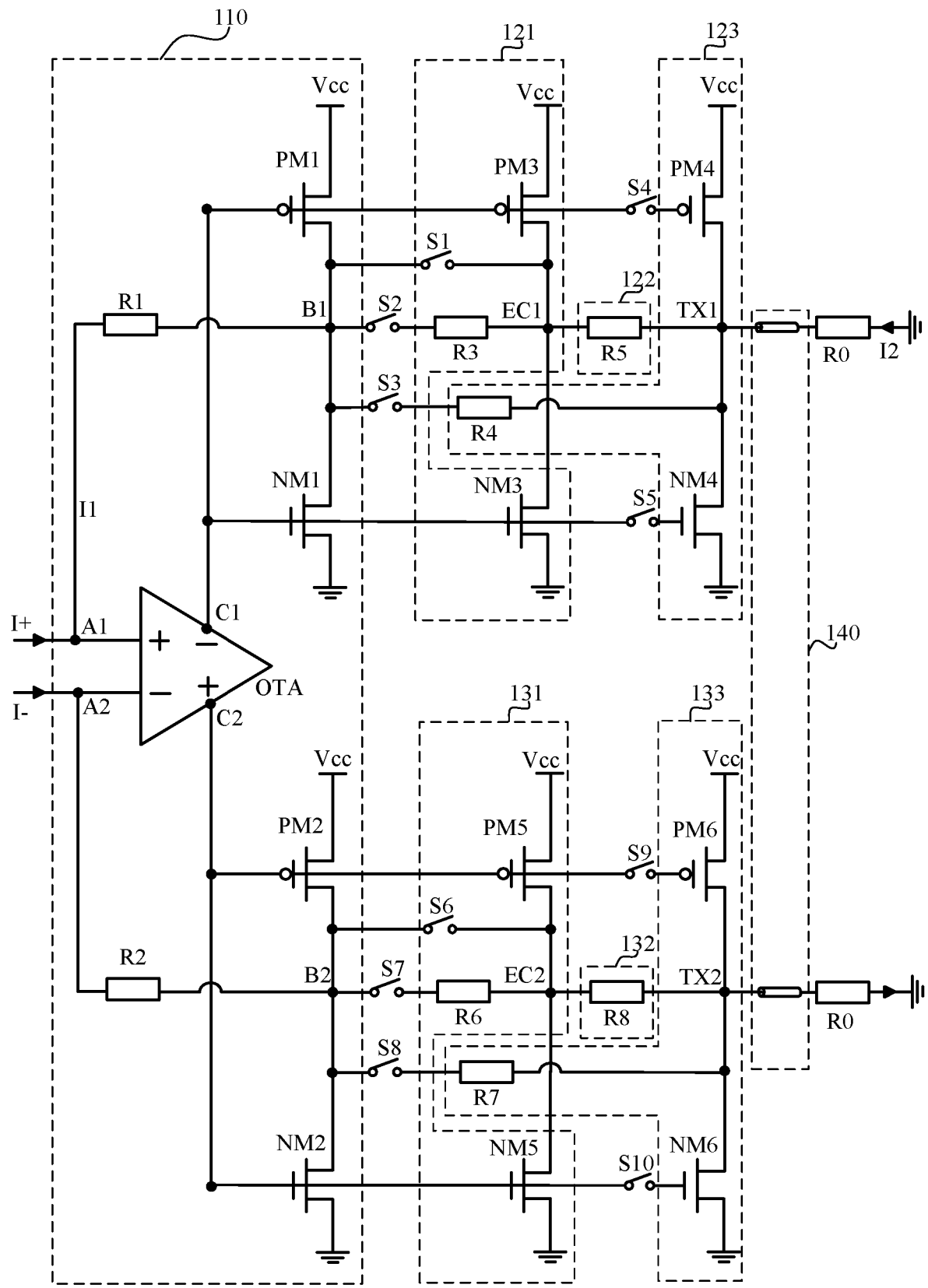
FIG. 6 shows another circuit diagram of a driver according to an embodiment of the present disclosure.

FIG. 6 shows another circuit diagram of the driver. With reference to FIG. 6, the driver further comprises a mode switching module, wherein the mode switching module comprises a first switching unit, a second switching unit and a controller (not shown in the figure). The first switching unit is connected to the first voltage driving unit 121 and the second voltage driving unit 122, respectively, the second switching unit is connected to the third voltage driving unit 131 and the fourth voltage driving unit 132, respectively, and the controller is connected to the first switching unit and the second switching unit, respectively.

In the case that the controller receives an instruction for selecting ethernet in 10BASE-T mode, the controller is configured to control the first switching unit and the second switching unit to be in the 10BASE-T mode, such that the first voltage driving unit 121, the second voltage driving unit 122, the third voltage driving unit 131 and the fourth voltage driving unit 132 both operate, and the driver of the ethernet transmitter is in the 10BASE-T mode. In the case that the controller receives an instruction for selecting ethernet in 100BASE-TX/1000BASE-T mode, the controller is configured to control the first switching unit and the second switching unit to be in the 100BASE-TX/1000BASE-T mode, such that the first voltage driving unit 121 and the third voltage driving unit 131 operate, the second voltage driving unit 122 and the fourth voltage driving unit 132 are not connected to the circuit, and the driver of the ethernet transmitter is in 100BASE-TX/1000BASE-T mode. By use of the mode switching module, a single driver may simultaneously meet the requirements of standard performance evaluation corporation (SPEC) in 10BASE-T, 100BASE-TX and 1000BASE-T modes, such that static power consumption can be saved.

The first switching unit comprises a first switch S1 connected in series between the first output terminal B1 of the signal conversion module 110 and the first node EC1, a second switch S2 arranged on a connecting line between the first output terminal B1 of the signal conversion module 110 and the third resistor R3, a third switch S3 arranged on a connecting line between the first output terminal B1 of the signal conversion module 110 and the fourth resistor R4, a fourth switch S4 arranged on a connecting line between the gate electrode PM4 of the fourth PMOS transistor and the operational amplifier OTA, and a fifth switch S5 arranged on a connecting line between the gate electrode NM4 of the fourth NMOS transistor and the operational amplifier OTA.

The second switching unit comprises a sixth switch S6 connected in series between the second output terminal B2 of the signal conversion module 110 and the second node EC2, a seventh switch S7 arranged on a connecting line between the second output terminal B2 of the signal conversion module 110 and the sixth resistor R6, an eighth switch S8 arranged on a connecting line between the second output terminal B2 of the signal conversion module 110 and the seventh resistor R7, a ninth switch S9 arranged on a connecting line between the gate electrode PM6 of the sixth PMOS transistor and the operational amplifier OTA, and a tenth switch S10 arranged on a connecting line between the gate electrode NM6 of the sixth NMOS transistor and the operational amplifier OTA.

The controller is connected to the first switch S1, the second switch S2, the third switch S3, the fourth switch S4, the fifth switch S5, the sixth switch S6, the seventh switch S7, the eighth switch S8, the ninth switch S9 and the tenth switch S10, respectively, and is configured to control on and off states of the first switch S1, the second switch S2, the third switch S3, the fourth switch S4, the fifth switch S5, the sixth switch S6, the seventh switch S7, the eighth switch S8, the ninth switch S9 and the tenth switch S10, such that the second switch S2, the third switch S3, the fourth switch S4, the fifth switch S5, the seventh switch S7, the eighth switch S8, the ninth switch S9, and the tenth switch S10 have the same on or off state, which is opposite to the on or off state of the first switch S1, and the first switch S1 and the sixth switch S6 have the same on or off state.

Figure 7:
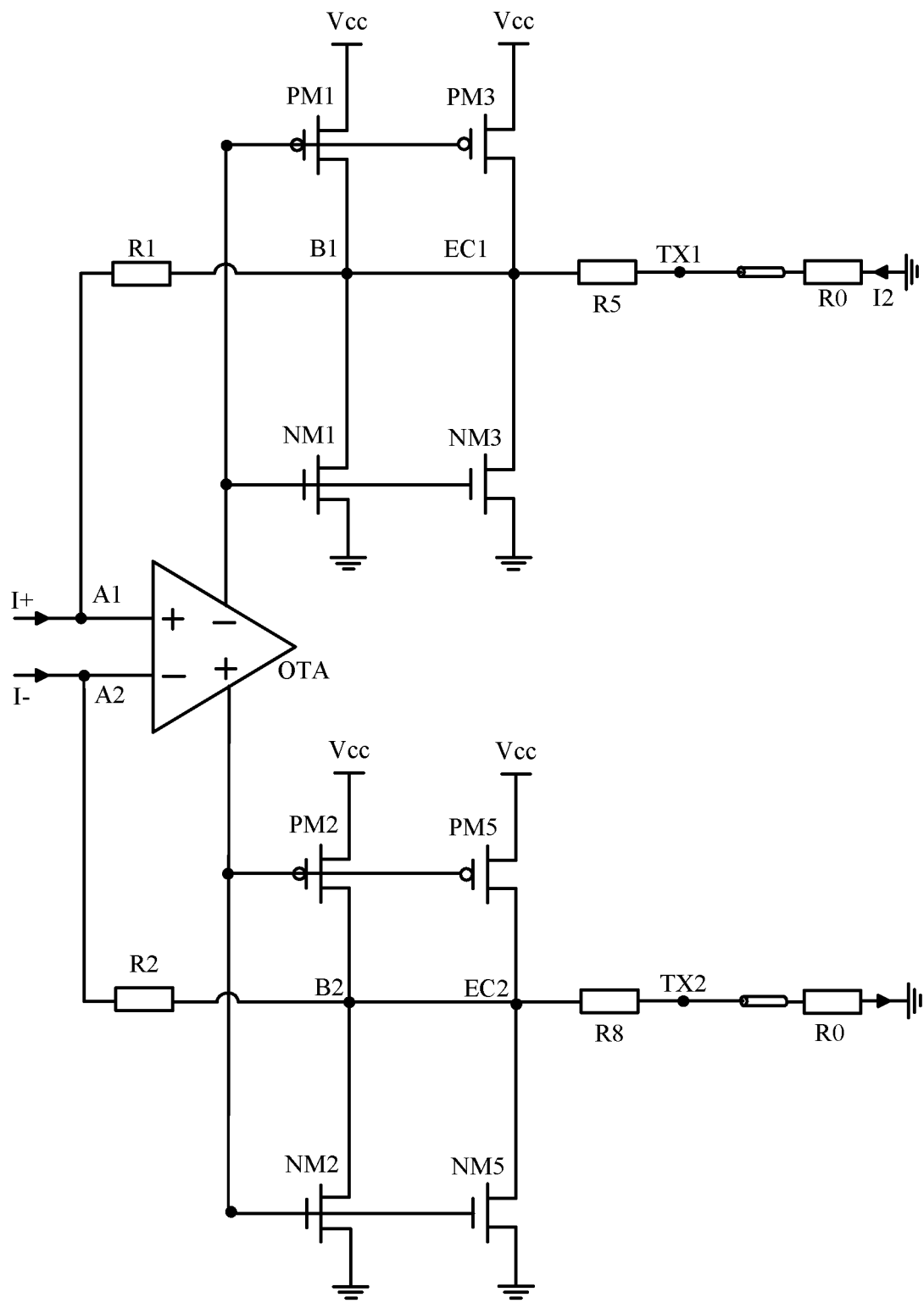
FIG. 7 shows an equivalent circuit diagram of the driver shown in FIG. 6 applied in 100BASE-TX/1000BASE-T mode.

In the driver circuit shown in FIG. 6, in the case that the first switch S1 and the sixth switch S6 are both off, and the second switch S2, the third switch S3, the fourth switch S4, the fifth switch S5, the seventh switch S7, the eighth switch S8, the ninth switch S9 and the tenth switch S10 are all on, an equivalent circuit diagram is shown in FIG. 7. Only part of components of the first voltage driving unit 121 and part of components of the third voltage driving unit 131 are connected into the circuit, the equivalent impedance Z11 is equal to 0 as viewed from the TX1 terminal to the first voltage driving unit 121, the equivalent impedance Z12 is infinite as viewed from the TX1 terminal to the second voltage driving unit 122, the first equivalent impedance Ro1 is obtained as viewed from the TX1 terminal to the first driving module 120, and in this case, the first equivalent impedance Ro1 is equal to resistance of the first impedance matching unit 123. Since the first impedance matching unit 123 has resistance equal to the external equivalent impedance R0, the first equivalent impedance Ro1 matches the external equivalent impedance R0. Impedance of the second driving module 130 has a similar situation, and will not be repeated here.

In the circuit diagram shown in FIG. 7, the first output terminal B1 of the signal conversion module 110 is directly connected to the first node EC1, and the second output terminal B2 of the signal conversion module 110 is directly connected to the second node EC2. It should be understood that since the first node EC1 is directly connected to the first output terminal B1 of the signal conversion module 110 and the second node EC2 is directly connected to the second output terminal B2 of the signal conversion module 110, a voltage of the first node EC1 and a voltage of the second node EC2 are controlled by the differential current signals received by the signal conversion module 110. In the circuit, the first driving module 120 has the first equivalent impedance equal to resistance of the fifth resistor R5, and since the fifth resistor R5 has resistance equal to the external equivalent impedance R0 (that is, R5=R0), the equivalent output impedance of the driver matches the external equivalent impedance R0. Moreover, due to R5=R0, a voltage $V_{TX1}$ generated at the node TX1 as one voltage generating terminal of the driver is one half of a voltage $V_{EC1}$ of the first node EC1, that is, $V_{TX1}=V_{EC1}/2$. Similarly, a voltage $V_{TX2}$ generated by the node TX2 as the other voltage generating terminal of the driver is one half of a voltage $V_{EC2}$ of the second node EC2, that is $V_{TX2}=V_{EC2}/2$. One voltage generated by the driver is one half of the voltage $V_{EC1}$ controlled by the operational amplifier OTA, and the other one is one half of the $V_{EC2}$ controlled by the operational amplifier, and there is a multiple relation between an output swing on the basis of ethernet in 10BASE-T mode and an output swing on the basis of ethernet in 100BASE-TX/1000BASE-T mode, such that the circuit in this case corresponds to a driver circuit in 100BASE-TX/1000BASE-T mode, and meets the requirement on impedance matching.

In the driver circuit shown in FIG. 6, in the case that the first switch S1 and the sixth switch S6 are both off, and the second switch S2, the third switch S3, the fourth switch S4, the fifth switch S5, the seventh switch S7, the eighth switch S8, the ninth switch S9 and the tenth switch S10 are all on, the equivalent circuit diagram is shown in FIG. 3, and the first voltage driving unit 121 and the second voltage driving unit 122 of the first driving module 120 are both connected to the circuit. As long as the parallel resistance of the equivalent impedance Z11 and the first impedance matching unit 123 connected in series with the impedance Z12 is equal to the external equivalent impedance R0, impedance matching may be further ensured in the 10BASE-T mode. The impedance of the second driving module 130 has a similar situation. According to the driver, in the 10BASE-T mode, an architecture having a relatively small area can be realized, and the ethernet transmitter can meet requirements on impedance matching and large output swing in the 10BASE-T mode. An impedance setting principle of the second driving module 130 is the same as that of the first driving module 120, and will not be repeated here. According to the driver provided in the present disclosure, all elements in the circuit match according to the above analysis result in practical application.

Taking the first driving module 120 as an example, since the transmitter and the receiver share one signal line in the 1000BASE-T mode, when the receiver receives a desired signal, a transmission signal in the signal line needs to be removed, and in FIG. 7, a signal at the first node EC1 is used for removing a reflected signal contained in a signal at the node TX1. In the 10BASE-T mode and 100BASE-TX mode, the transmitter and receiver each use a signal line. In the circuit diagram shown in FIG. 6, a signal at a first node EC1 is retained in the three modes of 10BASE-T, 100BASE-TX and 1000BASE-T, which is beneficial to improving linearity of the system. A signal processing principle of the second driving module 130 is similar, and will not be repeated here.

Compared with various existing solutions, the driver provided in FIG. 6 is constructed on the basis of one operational amplifier OTA, twelve transistors, eight resistors and some switches, the number of operational amplifiers is reduced compared with the prior art, and the number of transistors, resistors and switches is also reduced, such that the driver has outstanding advantages in circuit occupied area.

Figure 8:
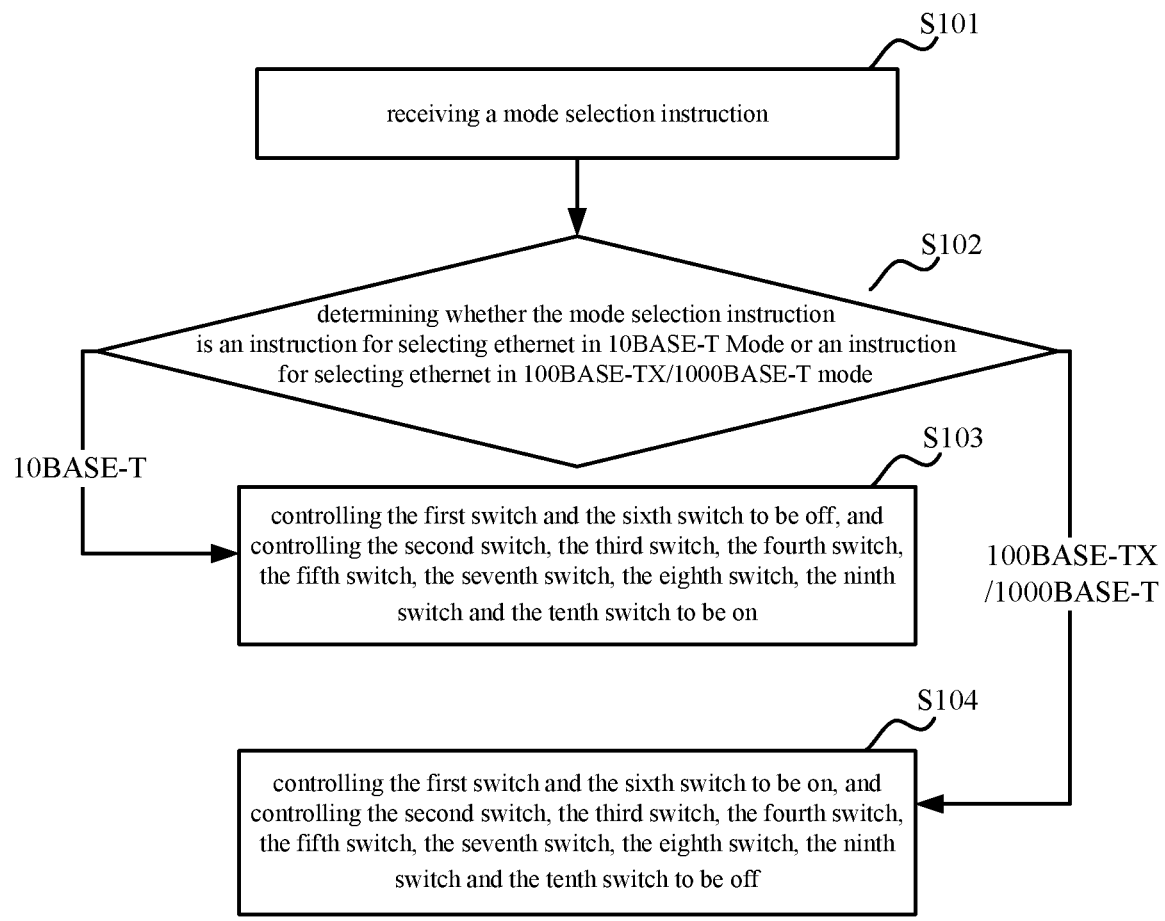
FIG. 8 shows a flow diagram of a control method for a driver according to an embodiment of the present disclosure.

Corresponding to the driver of the ethernet transmitter shown in FIG. 6, the present disclosure further provides a control method for controlling the driver to realize dual mode switching, such that requirements of SPEC under three modes of 10BASE-T, 100BASE-TX and 1000BASE-T may be met simultaneously by using a single driver, and static power consumption is saved. FIG. 8 is a flowchart of the control method. An implementation body of the control method is the controller comprised in the above-described mode switching module 110. With reference to FIG. 8, the control method comprises:

step S101, receiving a mode selection instruction;

step S102, determining whether the mode selection instruction is an instruction for selecting ethernet in 10BASE-T mode or an instruction for selecting ethernet in 100BASE-TX/1000BASE-T mode; implementing step S103 in the case that the mode selection instruction is the instruction for selecting ethernet in the 10BASE-T mode; and implementing step S104 in the case that the mode selection instruction is the instruction for selecting ethernet in 100BASE-TX/1000BASE-T mode;

step S103, controlling a first switch S1 and a sixth switch S6 to be off, and controlling a second switch S2, a third switch S3, a fourth switch S4, a fifth switch S5, a seventh switch S7, an eighth switch S8, a ninth switch S9 and a tenth switch S10 to be on; and step S104, controlling the first switch S1 and the sixth switch S6 to be on, and controlling the second switch S2, the third switch S3, the fourth switch S4, the fifth switch S5, the seventh switch S7, the eighth switch S8, the ninth switch S9 and the tenth switch S10 to be off.

Corresponding to the driver of the ethernet transmitter, the present disclosure further provides an ethernet transmitter, the ethernet transmitter comprises any driver described above, so as to generate an output voltage (a difference between the first output signal and the second output signal is the output voltage) by use of the driver, such that the problem of serious return loss caused by a large circuit area may be avoided in the case that the requirements on impedance matching and large output swing in 10BASE-T mode are met. Furthermore, one driver may simultaneously meet the requirements of SPEC under the three ethernet modes of 10BASE-T, 100BASE-TX and 1000BASE-T by means of dual mode switching, such that static power consumption is saved.

Moreover, the terms "comprise", "include", "contain" or any other variants thereof are intended to cover non-exclusive inclusions, such that a process, a method, an article or equipment including a series of elements not only includes those elements, but also includes those elements that are not explicitly listed, or also includes elements inherent to this process, method, article or equipment. In the case of no more limitations, the element limited by the sentence "including a . . . " does not exclude that there exists another same element in the process, method, article or equipment including the element.

Finally, it should be noted that the above embodiments are merely examples given for clearly illustrating the present disclosure, and are not intended to limit implementations. A person of ordinary skill in the art may further make other changes or variations in a different form on the basis of the above description. Herein, examples are unnecessarily provided for all implementation manners. Obvious modifications or variations made thereto shall still fall within the scope of the present disclosure.

What is claimed is:

1. A driver of an ethernet transmitter, wherein the driver has a first output port and a second output port which are connected to an ethernet receiver through a transmission line, and comprises a signal conversion circuit, a first driving circuit and a second driving circuit, wherein, the signal conversion circuit comprises an operational amplifier for converting differential current signals into different voltage signals, and is connected to a previous-stage circuit, and is configured to convert differential current signals provided by the previous-stage circuit into a first voltage signal and a second voltage signal and transmit the first voltage signal and the second voltage signal to the first driving circuit and the second driving circuit, respectively, the first driving circuit is connected between a first output terminal of the signal conversion circuit and the first output port, and is configured to adjust a swing of the first voltage signal, so as to obtain a first output signal at the first output port, wherein the first output signal has a voltage equal to the first voltage signal, and the second driving circuit is connected between a second output terminal of the signal conversion circuit and the second output port, and is configured to adjust a swing of the second voltage signal, so as to obtain a second output signal at the second output port, wherein the second output signal has a voltage equal to the second voltage signal.

2. The driver according to claim 1, wherein, the first driving circuit comprises a first voltage driving unit, a second voltage driving unit and a first impedance matching unit;

the first voltage driving unit and the first impedance matching unit are connected in series between the first output terminal of the signal conversion circuit and the first output port, and are connected to the second voltage driving unit in parallel, such that a first equivalent impedance of the first driving circuit matches an equivalent impedance of a driver of the ethernet receiver;

the second driving circuit comprises a third voltage driving unit, a fourth voltage driving unit and a second impedance matching unit; and the third voltage driving unit and the second impedance matching unit are connected in series between the second output terminal of the signal conversion circuit and the second output port, and are connected to the fourth voltage driving unit in parallel, such that a second equivalent impedance of the second driving circuit matches the equivalent impedance of the driver of the ethernet receiver.

3. The driver according to claim 2, wherein the signal conversion circuit comprises the operational amplifier, a first conversion unit, and a second conversion unit;

a first input terminal and a second input terminal of the operational amplifier are connected to the previous-stage circuit, respectively and the operational amplifier is configured to convert the differential current signals into differential voltage signals;

the first conversion unit comprises a first PMOS transistor and a first NMOS transistor, a drain electrode of the first PMOS transistor and a drain electrode of the first NMOS transistor are both connected to an input terminal of the first driving circuit, a gate electrode of the first PMOS transistor and a gate electrode of the first NMOS transistor are both connected to a first output terminal of the operational amplifier, a source electrode of the first PMOS transistor is connected to a power supply terminal, a source electrode of the first NMOS transistor is grounded, and the drain electrode of the first PMOS transistor outputs the first voltage signal; the first conversion unit further comprises a first resistor connected in series between the first input terminal of the operational amplifier and the drain electrode of the first PMOS transistor;

the second conversion unit comprises a second PMOS transistor and a second NMOS transistor, a drain electrode of the second PMOS transistor and a drain electrode of the second NMOS transistor are both connected to an input terminal of the second driving circuit, a gate electrode of the second PMOS transistor and a gate electrode of the second NMOS transistor are both connected to a second output terminal of the operational amplifier, a source electrode of the second PMOS transistor is connected to the power supply terminal, a source electrode of the second NMOS transistor is grounded, and the drain electrode of the second PMOS transistor outputs the second voltage signal; and the second conversion unit further comprises a second resistor connected in series between the second input terminal of the operational amplifier and the drain electrode of the second PMOS transistor.

4. The driver according to claim 3, wherein the first voltage driving unit comprises a third PMOS transistor and a third NMOS transistor, a drain electrode of the third PMOS transistor and a drain electrode of the third NMOS transistor are connected to a first node, a gate electrode of the third PMOS transistor and a gate electrode of the third NMOS transistor are both connected to the first output terminal of the operational amplifier, a source electrode of the third PMOS transistor is connected to the power supply terminal, and a source electrode of the third NMOS transistor is grounded; the first voltage driving unit further comprises a third resistor connected in series between the first output terminal of the signal conversion circuit and the first node;

the second voltage driving unit comprises a fourth PMOS transistor and a fourth NMOS transistor, a drain electrode of the fourth PMOS transistor and a drain electrode of the fourth NMOS transistor are both connected to the first output port, a gate electrode of the fourth PMOS transistor and a gate electrode of the fourth NMOS transistor are both connected to the first output terminal of the operational amplifier, a source electrode of the fourth PMOS transistor is connected to the power supply terminal, and a source electrode of the fourth NMOS transistor is grounded; the second voltage driving unit further comprises a fourth resistor connected in series between the first output terminal of the signal conversion circuit and the first output port; and the first impedance matching unit comprises a fifth resistor connected in series between the first node and the first output port.

5. The driver according to claim 4, wherein the third voltage driving unit comprises a fifth PMOS transistor and a fifth NMOS transistor, a drain electrode of the fifth PMOS transistor and a drain electrode of the fifth NMOS transistor are connected to a second node, a gate electrode of the fifth PMOS transistor and a gate electrode of the fifth NMOS transistor are both connected to the second output terminal of the operational amplifier, a source electrode of the fifth PMOS transistor is connected to the power supply terminal, and a source electrode of the fifth NMOS transistor is grounded; the third voltage driving unit further comprises a sixth resistor connected in series between the second output terminal of the signal conversion circuit and the second node;

the fourth voltage driving unit comprises a sixth PMOS transistor and a sixth NMOS transistor, a drain electrode of the sixth PMOS transistor and a drain electrode of the sixth NMOS transistor are both connected to the second output port, a gate electrode of the sixth PMOS transistor and a gate electrode of the sixth NMOS transistor are both connected to the second output terminal of the operational amplifier, a source electrode of the sixth PMOS transistor is connected to the power supply terminal, and a source electrode of the sixth NMOS transistor is grounded; the fourth voltage driving unit further comprises a seventh resistor connected in series between the second output terminal of the signal conversion circuit and the second output port; and the second impedance matching unit comprises an eighth resistor connected in series between the second node and the second output port.

6. The driver according to claim 5, wherein a ratio of a width-to-length ratio of the third PMOS transistor to a width-to-length ratio of the first PMOS transistor is M, and a ratio of a width-to-length ratio of the third NMOS transistor to a width-to-length ratio of the first NMOS transistor is M, wherein M>40;

a ratio of a width-to-length ratio of the fourth PMOS transistor to a width-to-length ratio of the first PMOS transistor is N, and a ratio of a width-to-length ratio of the fourth NMOS transistor to a width-to-length ratio of the first NMOS transistor is N, wherein N>40;

a ratio of a width-to-length ratio of the fifth PMOS transistor to a width-to-length ratio of the second PMOS transistor is M, and a ratio of a width-to-length ratio of the fifth NMOS transistor to a width-to-length ratio of the second NMOS transistor is M; and a ratio of a width-to-length ratio of the sixth PMOS transistor to a width-to-length ratio of the second PMOS transistor is N, and a ratio of a width-to-length ratio of the sixth NMOS transistor to a width-to-length ratio of the second NMOS transistor is N.

7. The driver according to claim 5, wherein a resistance ratio of the third resistor to the fifth resistor is Y, and a resistance ratio of the fourth resistor to the fifth resistor is Z, wherein Y>100 and Z>100; and a resistance ratio of the sixth resistor to the eighth resistor is Y, and a resistance ratio of the seventh resistor to the eighth resistor is Z.

8. The driver according to claim 2, wherein the first impedance matching unit and the second impedance matching unit each have a resistance equal to the equivalent impedance of the driver of the ethernet receiver and equal to a characteristic impedance of the transmission line.

9. The driver according to claim 5, further comprising a mode switching module, wherein the mode switching module comprises a first switching unit, a second switching unit and a controller;

the first switching unit comprises a first switch connected in series between the first output terminal of the signal conversion circuit and the first node, a second switch arranged on a connecting line between the first output terminal of the signal conversion circuit and the third resistor, a third switch arranged on a connecting line between the first output terminal of the signal conversion circuit and the fourth resistor, a fourth switch arranged on a connecting line between the gate electrode of the fourth PMOS transistor and the operational amplifier, and a fifth switch arranged on a connecting line between the gate electrode of the fourth NMOS transistor and the operational amplifier;

the second switching unit comprises a sixth switch connected in series between the second output terminal of the signal conversion circuit and the second node, a seventh switch arranged on a connecting line between the second output terminal of the signal conversion circuit and the sixth resistor, an eighth switch arranged on a connecting line between the second output terminal of the signal conversion circuit and the seventh resistor, a ninth switch arranged on a connecting line between the gate electrode of the sixth PMOS transistor and the operational amplifier, and a tenth switch arranged on a connecting line between the gate electrode of the sixth NMOS transistor and the operational amplifier; and the controller is configured to control on and off states of the first switch, the second switch, the third switch, the fourth switch, the fifth switch, the sixth switch, the seventh switch, the eighth switch, the ninth switch and the tenth switch, such that the second switch, the third switch, the fourth switch, the fifth switch, the seventh switch, the eighth switch, the ninth switch and the tenth switch have the same on or off state, which is opposite to the on or off state of the first switch, and the first switch and the sixth switch have the same on or off state.

10. A control method for a driver, configured to control the driver of claim 9, and performed by the controller, the control method comprising:

receiving a mode selection instruction;

determining whether the mode selection instruction is an instruction for selecting ethernet in 10BASE-T mode or an instruction for selecting ethernet in 100BASE-TX/1000BASE-T mode;

controlling, in a case that the mode selection instruction is the instruction for selecting ethernet in the 10BASE-T mode, the first switch and the sixth switch to be off, and the second switch, the third switch, the fourth switch, the fifth switch, a-the seventh switch, the eighth switch, the ninth switch and the tenth switch to be on; and controlling, in a case that the mode selection instruction is the instruction for selecting ethernet in the 100BASE-TX/1000BASE-T mode, the first switch and the sixth switch to be on, and the second switch, the third switch, the fourth switch, the fifth switch, the seventh switch, the eighth switch, the ninth switch and the tenth switch to be off.

* * * * *